United States Patent
Hand et al.

(10) Patent No.: US 9,926,687 B2
(45) Date of Patent: Mar. 27, 2018

(54) LOCK ASSEMBLY

(71) Applicant: Keech Castings Australia Pty Limited, Bendigo (AU)

(72) Inventors: Alexander Edward Hand, Glenore Grove (AU); Luke Daniel Giudice, Epsom (AU); Balamurali Manjil Hebbar, Bendigo (AU)

(73) Assignee: Keech Castings Australia Pty Limited, Bendingo Victoria (AU)

( * ) Notice: Subject to any disclaimer, the term of this patent is extended or adjusted under 35 U.S.C. 154(b) by 99 days.

(21) Appl. No.: 14/780,451

(22) PCT Filed: Feb. 24, 2014

(86) PCT No.: PCT/AU2014/000165
§ 371 (c)(1),
(2) Date: Sep. 25, 2015

(87) PCT Pub. No.: WO2014/153591
PCT Pub. Date: Oct. 2, 2014

(65) Prior Publication Data
US 2016/0047110 A1    Feb. 18, 2016

(30) Foreign Application Priority Data

Mar. 25, 2013  (AU) ................................ 2013901026
Apr. 3, 2013   (AU) ................................ 2013901149

(51) Int. Cl.
*E02F 9/28*   (2006.01)
*A01B 23/02*  (2006.01)

(52) U.S. Cl.
CPC ............ *E02F 9/2841* (2013.01); *A01B 23/02* (2013.01); *E02F 9/285* (2013.01); *E02F 9/2825* (2013.01); *E02F 9/2883* (2013.01); *E02F 9/2891* (2013.01)

(58) Field of Classification Search
CPC ......... E02F 9/28; E02F 9/2841; E02F 9/2825; E02F 9/285; E02F 9/2883; E02F 9/2891; A01B 23/02
See application file for complete search history.

(56) References Cited

U.S. PATENT DOCUMENTS

| 4,067,657 A | 1/1978 | Kaarlela |
| 5,937,550 A | 8/1999 | Emrich |
(Continued)

FOREIGN PATENT DOCUMENTS

| WO | WO-02/103122 A1 | 12/2002 |
| WO | WO-2009/026650 A1 | 3/2009 |
(Continued)

OTHER PUBLICATIONS

"International Application Serial. PCT/AU2014/000165, International Search Report dated Mar. 31, 2014", 6 pgs.
(Continued)

*Primary Examiner* — Jamie L McGowan
(74) *Attorney, Agent, or Firm* — Schwegman Lundberg & Woessner, P.A.

(57) ABSTRACT

A lock assembly (1) including a main body (4) and a protruding member (5). The protruding member (5) is biased to normally protrude outwardly of the main body (4) by a biasing component (6), which is formed of rubber or like material. An operating mechanism, operated by a key (9) effects movement of the protruding member (5) between a protruded or locked position, and, a withdrawn or unlocked position.

14 Claims, 9 Drawing Sheets

(56) References Cited

U.S. PATENT DOCUMENTS

| | | |
|---|---|---|
| 6,574,892 B2 | 6/2003 | Creighton |
| 6,826,855 B2 | 12/2004 | Ruvang |
| 6,993,861 B2 | 2/2006 | Carpenter |
| 7,100,315 B2 | 9/2006 | Carpenter |
| 7,178,274 B2 | 2/2007 | Emrich |
| 7,578,081 B2 | 8/2009 | Bearden |
| 7,707,755 B2 | 5/2010 | Lopez Almendros et al. |
| 7,874,086 B2 | 1/2011 | Briscoe et al. |
| 8,127,476 B2 | 3/2012 | Bierwith |
| 9,322,150 B2 * | 4/2016 | Johnston ............... E02F 9/2825 |
| 2010/0050402 A1 | 3/2010 | Rissman |
| 2010/0115804 A1 * | 5/2010 | Lopez Almendros ........... E02F 9/2833 37/456 |

FOREIGN PATENT DOCUMENTS

| | | |
|---|---|---|
| WO | WO-2013/078101 A1 | 5/2013 |
| WO | WO-2014/153591 A1 | 10/2014 |

OTHER PUBLICATIONS

"International Application Serial. PCT/AU2014/000165, Written Opinion dated Mar. 31, 2014", 7 pgs.

* cited by examiner

LOCK ASSEMBLY

This application is a U.S. National Stage Filing under 35 U.S.C. 371 from International Application No. PCT/AU2014/000165, filed on Feb. 24, 2014, and published as WO 2014/153591 A1 on Oct. 2, 2014, which claims the benefit of priority under 35 U.S.C. § 119 to Australian Provisional Patent Application No. 2013901026, filed on Mar. 25, 2013, and to Australian Provisional Patent Application No. 2013901149, filed on Apr. 3, 2013 which are hereby incorporated by reference herein in their entireties.

BACKGROUND OF THE INVENTION

The present invention relates to a lock assembly, and in particular, to a lock assembly which is used for releasably securing two components together, such as, but not limited to, securing a wear tooth to a nose of an excavator.

DESCRIPTION OF THE PRIOR ART

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

A large number of different mechanisms are known for securing wear teeth to the nose of an excavator.

Traditionally, wear teeth were welded to the nose of an excavator. As the wear teeth wore out, it was a laborious and time consuming, and therefore costly, exercise to unweld the wear teeth, and then replace them with new wear teeth.

Various mechanisms have since been designed to allow wear teeth to be releasably secured to the nose of an excavator, without the need for welding. One such arrangement is described in the Applicant's earlier Patents/Patent Applications, including International Patent Application No. PCT/AU2002/000790, the disclosures of which should be considered to be entirely incorporated herein by this reference thereto.

In the Applicant's earlier above-referenced Patent documents, there is described a locking arrangement for releasably locking a wear tooth to a tooth adaptor. The wear tooth is provided with a slot which, when inserted over the nose of the excavator, substantially aligns with a cavity. The locking device is then inserted into the aligned slot and cavity to thereby secure the components together. The locking arrangement of the aforementioned Patent Application includes a pair of engaging retaining pieces which are adapted to fit in end-abutting relationship to securely lock the two components together. An arcuate force may be applied to one of the pieces to release the pieces from the locked position.

Whilst the aforementioned Application provides significant advantages in reducing the time and labour and therefore cost involved in replacing wear teeth over the prior art devices thereto, the Applicant has now invented a lock assembly which provides significant improvements, or at least an alternative to this earlier device.

SUMMARY OF THE INVENTION

The present invention seeks to provide a lock assembly which has a different and improved operating mechanism to prior art locking devices.

In one broad form, the present invention provides a lock assembly including:
 a body;
 a protruding member, adapted to selectively protrude from said body; and,
 an operating mechanism, to effect movement of said protruding member between a protruded or locked position and a withdrawn or unlocked position.

Preferably, said lock assembly is adapted to be used to releasably secure a first member to a second member.

Also preferably, said first member is an excavator wear tooth and said second member is a nose of an excavator.

Preferably, said body includes a base portion and a retaining portion, wherein the base portion is adapted to be inserted within a retaining cavity of said second member/nose, and, said retaining portion is adapted to at least partially extend into a retaining aperture of said first member/wear tooth.

Preferably, said protruding member is adapted to selectively protrude from within said base portion of said body, such that, said base portion of said body and said protruding member together abut said retaining cavity to be thereby captively retained therein.

Preferably, said protruding member is biased to normally protrude from said body, whereby to install said lock assembly in said retaining cavity/aperture, the body is pushed, by hand or otherwise.

Also preferably, at least part of said retaining portion of said body is adapted to bear against at least part of said retaining aperture, to thereby secure said first member to said second member.

Also preferably, said key is used to effect movement of said protruding member from said protruded or locked position to said withdrawn or unlocked position.

Also preferably, said key is used to move said body in an arcuate manner, to rotate and pull, or otherwise apply a force to rotate or move said lock assembly out from said retaining cavity and said retaining aperture.

Preferably, said operating mechanism is operated by a key which is rotated or otherwise moved to effect movement of said protruding member.

Preferably, said protruding member includes a gear, a slot, or other cooperating mechanism which cooperates with an end of said key, such that when said key is turned or rotated, said end of said key moves said protruding member between said protruded or locked position and said withdrawn or unlocked position.

Also preferably, said key is removably inserted into a key hole in said body.

Preferably, said key is inserted into said body via said retaining aperture.

Also preferably, said key is turned by a user to operate said gear or other mechanism and thereby effect movement of said protruding member.

Also preferably, said key is used as a lever to move said lock assembly in an arcuate manner to rotate said assembly out from the retaining cavity and retaining aperture.

Preferably, said operating mechanism includes a biasing means to bias said protruding member into said protruded or locked position, or, said withdrawn or unlocked position.

Also preferably, said operating means includes a biasing means to normally bias said protruding member into said protruded or locked position.

Also preferably, said key is used to effect movement of said protruding member to said withdrawn or unlocked position, against the bias of said biasing means.

Preferably, said retaining aperture is shaped so as to permit said resiliently biased protruding member to be guided into position as it is being inserted via said retaining aperture into said retaining cavity.

Also preferably, said retaining aperture is larger in dimension than said retaining cavity, such that, when in the protruded or locked position, a shoulder about said retaining aperture impedes said body from being removed.

Preferably, said biasing means is formed of rubber material.

Also preferably, said rubber material is adapted to operate at a wide temperature range, such as, but not limited to −45° C. to +150° C.

Also preferably, at least one of said body and said protruding member is formed of substantially corrosion resistant material.

Also preferably, said keyhole is adapted to receive a dirt plug therein, during use of said lock assembly.

In a further broad form, the present invention provides a locking system, including:
a first member, including a retaining aperture;
a second member, including a retaining cavity; and,
a lock assembly, for securing said first member to said second member, said lock assembly including:
 a body including a base portion and a retaining portion, wherein the base portion is adapted to be inserted within a retaining cavity of said second member, and said retaining portion is adapted to at least partially extend into a retaining aperture of said first member;
 a protruding member, adapted to selectively protrude from said body; and,
 an operating mechanism, to effect movement of said protruding member between a protruded or locked position, and, a withdrawn or unlocked position.

Preferably, said first member is a wear tooth of an excavator, and said second member is a nose of and excavator to which said wear tooth is removably attached.

In yet a further broad form, the present invention provides a method of securing a wear tooth to a nose of an excavator, the method including the steps of:
positioning said wear tooth about the nose of the excavator, so as to substantially align a retaining aperture of said tooth with a retaining cavity of said nose;
inserting a lock assembly via said aperture into said cavity, the lock assembly including:
 a body having a base portion and a retaining portion, and,
 a protruding member biased to protrude from said body;
whereby, said base portion of said body and said protruding member together abut said retaining cavity to be thereby captively retained therein and secure said wear tooth to said nose of said excavator.

Preferably, said lock assembly is inserted into said cavity by a user pressing said body into said aperture/cavity by hand, that is, without the need for a key or other tool.

In yet a further broad form, the present invention provides a method of releasing a wear tooth from the nose of an excavator, the method including the steps of:
inserting a key into a key hole of a lock assembly, the lock assembly including:
 a body;
 a protruding member, biased to normally protrude from said body; and,
 an operating mechanism, to effect movement of said protruding member between a protruded or locked position and a withdrawn position;

turning said key to operate said operating mechanism and thereby effect withdrawal of said protruding member into said body against the bias of said biasing means;
moving said key in an arcuate manner to thereby rotate said lock assembly out from the retaining cavity and the retaining aperture; and,
removing said wear tooth from said nose of said excavator.

Also preferably, in said moving step, said key is moved by hand in said arcuate manner to thereby remove said body from said retaining cavity/aperture.

BRIEF DESCRIPTION OF THE DRAWINGS

The present invention will become more fully understood from the following detailed description of preferred but non-limiting embodiments thereof, described in connection with the accompanying drawings, wherein.

DETAILED DESCRIPTION OF PREFERRED EMBODIMENTS

Throughout the drawings, like numerals will be used to identify similar features, except where expressly otherwise indicated.

Figure 1:
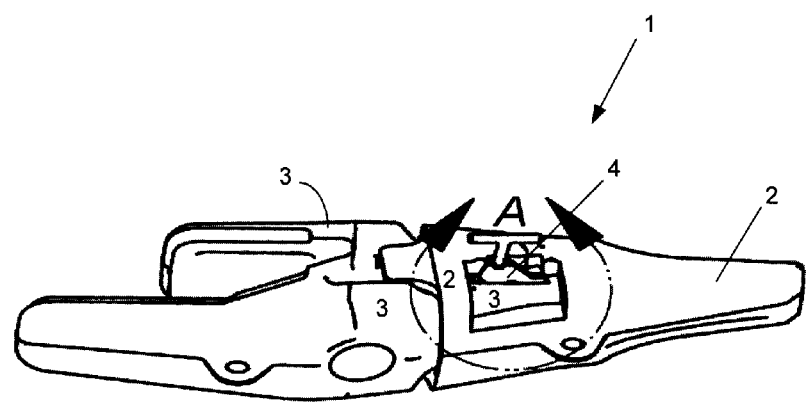
FIG. 1 illustrates a wear tooth supplied on the nose of an excavator showing the various components of a lock assembly in accordance with the present invention.

A lock assembly, a preferred embodiment of which is shown in FIG. 1 and which is generally designated by the numeral 1, may typically be used to secure an excavator wear tooth 2 to the nose 3 of an excavator. It should however be appreciated that the lock assembly 1 in accordance with the present invention is not necessarily limited to locking these two particular types of components together. That is, the lock assembly 1 of the present invention may be used to attach or lock any two components to each other in a secure manner, so that they may also be easily released from being locked together.

Figure 3:
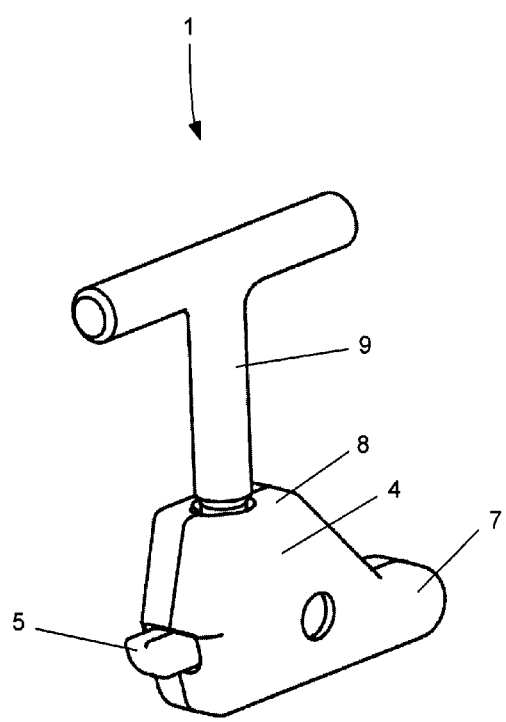
FIG. 3 illustrates a perspective view of the lock assembly in accordance with the present invention, and, a key for operating the lock assembly.
Figure 4:
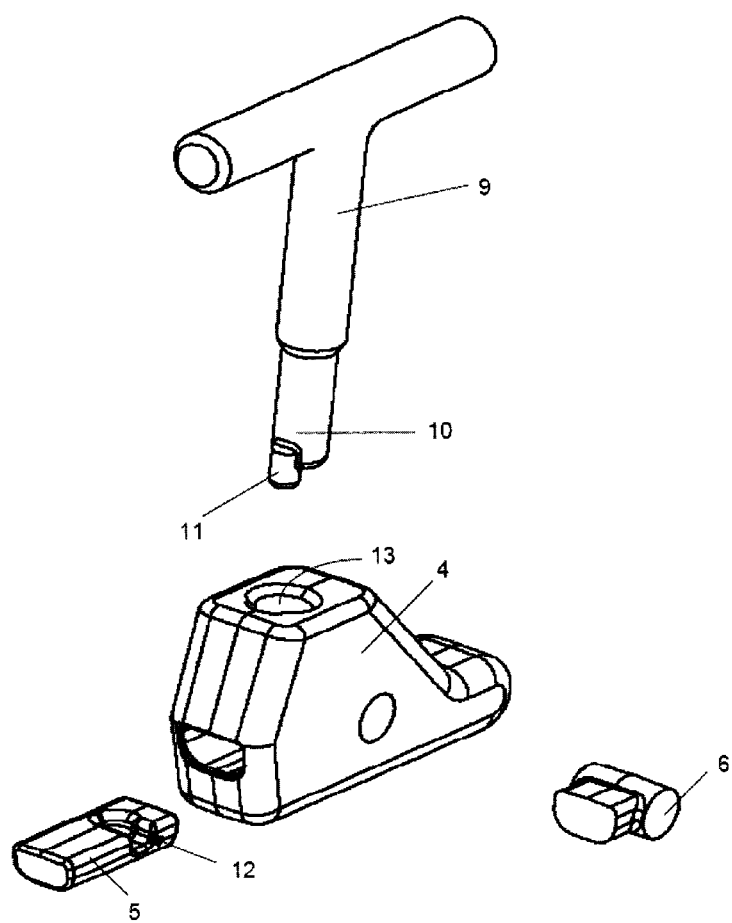
FIG. 4 illustrates an exploded view of the lock assembly (and key) shown in FIG. 3.

The lock assembly, as generally designated by the numeral 1, and as also shown in FIGS. 3 and 4, includes a main body 4, a protruding member 5, and, an operating mechanism (to be described hereinafter).

A variety of operating mechanisms may be embodied to effect movement of the protruding member 5 between a protruded or locked position, wherein an end of the protruding member 5 is biased or otherwise positioned to extend outwards off the body 4, and, a withdrawn or unlocked position, wherein the end of the protruding member 5 is substantially withdrawn into the body 4. In the withdrawn position (not shown), the end face of the protruding member 5 would be substantially aligned with or behind the face of the protruding member 4.

As shown in the drawings, the body 4 of the lock mechanism 1 may be described to include a base portion 7 and a retaining portion 8.

Figure 2:
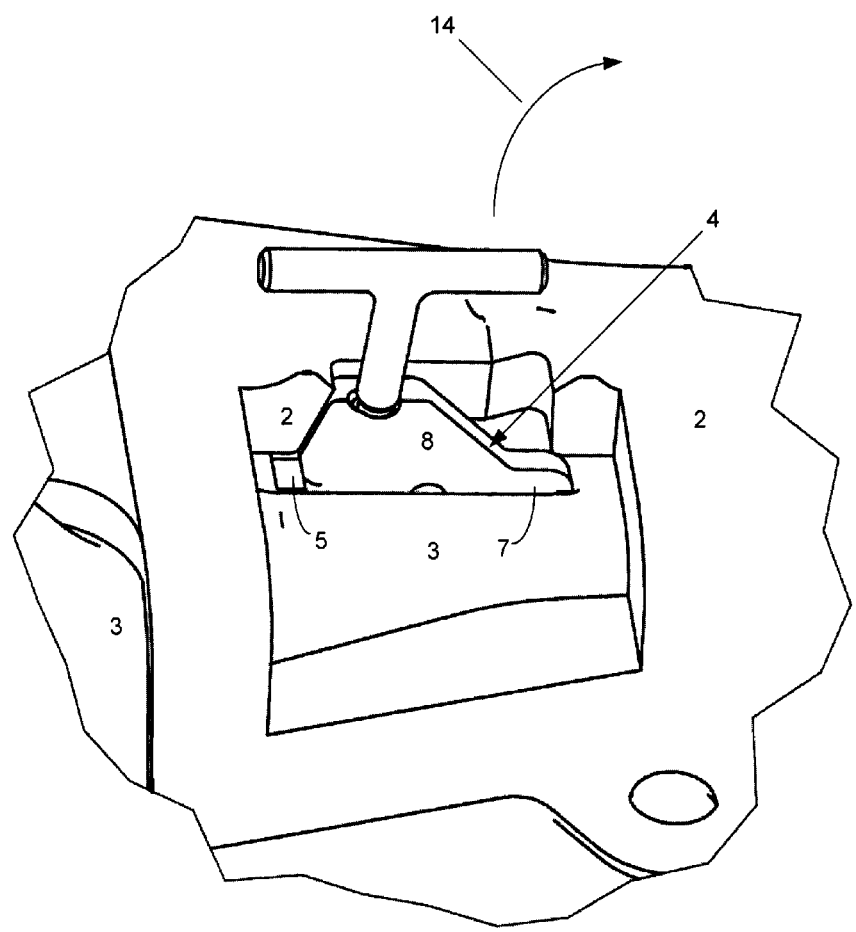
FIG. 2 illustrates an enlarged view of the locking component shown in FIG. 1.

In use, and as shown in FIGS. 1 and 2, the base portion 7 may typically be adapted to be substantially inserted within a retaining cavity of the second member or nose 3 of the excavator. The retaining portion 8 is adapted to at least partially extend into a retaining aperture of the first member or wear tooth 2. The body 4 is thereby adapted to snugly fit within the aligned retaining cavity of the nose 3 and the retaining apparatus of the tooth 2, so that, when inserted in this position, it effectively abuts the walls of the aligned aperture/cavity to effectively impede any movement of the tooth relative to the nose, thereby effectively securing the components together.

The protruding member 5 is adapted to selectively protrude from within the base portion 7 of the body 4 such that the base portion 7 of the body 4 and the protruding member 5 together abut the retaining cavity of the second member or nose of the excavator and be thereby captively retained therein. At least part of the retaining portion 8 of the body 4 is preferably adapted to bear against at least part of the retaining aperture of the first member or wear tooth 2 to thereby secure the first member to the second member.

Figure 5A:
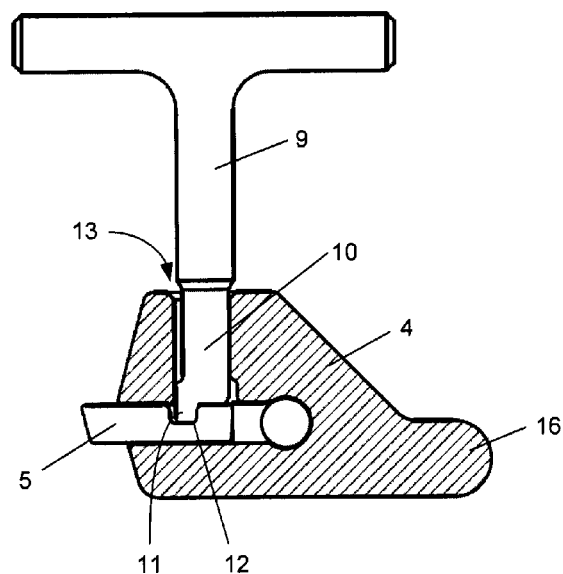
FIG. 5(a) illustrates the protruding member 5 in the protruded or locked position, and, FIG. 5(b) illustrates the protruding member 5 in the retracted or unlocked position.
Figure 5B:
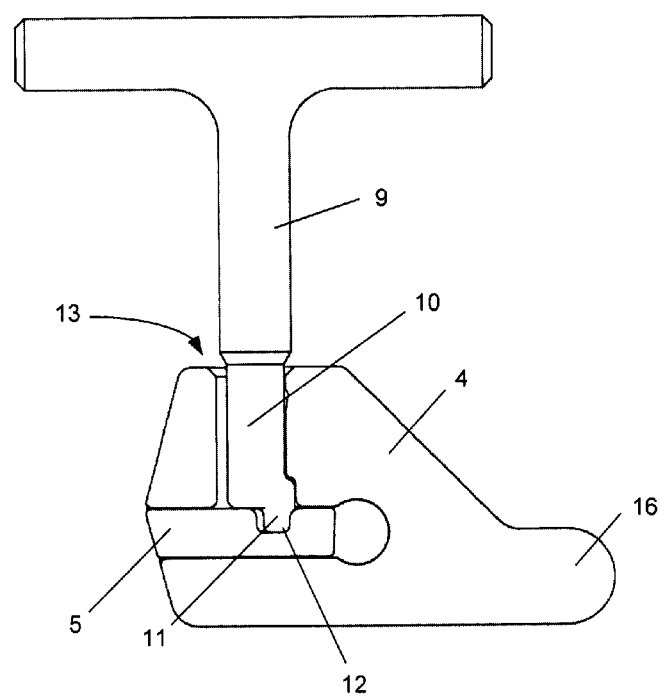
FIG. 5 illustrates cross-sectional views of the lock assembly and key of FIG. 3 in accordance with the present invention.

In a preferred but non-limiting form, the operating mechanism may be operated by a key 9 which is moved or rotated (for example as shown by the arrows in FIG. 1) to effect movement of the protruding member 5 between the protruded or locked position as shown in FIG. 5(*a*), and, the withdrawn or unlocked position as shown in FIG. 5(*b*). Persons skilled in the art will recognise a variety of cooperating mechanisms by which this function may be achieved. For example, each of the key and the protruding member may have cooperating gears thereon which interengage such that rotation of the key 9 effects lineal outwardly/inward movement of the protruding member 5 from the body 4. Alternatively, and as illustrated in the drawings, and as perhaps best shown in FIGS. 4 and 5, the end 10 of the key 9 may be provided with a finger 11 which is received within a cooperating slot 12 of the protruding member 5 such that, by rotational movement of the key 9 the protruding member 5 is consequently linearly moved between the protruded and withdrawn positions.

Such a mechanism may, in one alternative embodiment of the invention, be used to move the protruding member in both an inward and outward manner.

Once appropriate movement of the protruding member 5 is effected, the key 9, or at least part thereof, may be removed from the keyhole 13 in the body 4. As will be seen in FIGS. 1 and 2, the key may be inserted into the keyhole 13 of the body 4 via the retaining aperture provided in the wear tooth 2.

It will therefore be understood that by turning the key, the gear or other mechanism thereby effects movement of the protruding member.

However, in a most preferred embodiment of the present invention, the lock assembly also further incorporates a biasing means to bias the protruding member into either the protruded or withdrawn position. Most preferably, the biasing mechanism may be embodied in the form of a resiliently deformable material such as rubber or the like. Preferably, the protruding member is normally biased into the protruded or locked position such that it is normally forced into the outward position such as shown in FIGS. 5 and 3.

The material chosen for the biasing means 6 may have predetermined characteristics to enable an appropriate amount of resiliency such that the lock assembly may be inserted by hand into position once the first members and second members are aligned and ready to receive the lock. The biasing means may, for example, be formed of a rubber or like material which provides an appropriate amount of springiness. Being of rubber or like non-metal material also eliminates the need for lubricants. It also then fills the cavity to prevent the ingress of dirt or other foreign materials.

Specialised rubber material to suit operation in various temperatures may be chosen. For example, in extremely cold environments, rubbers able to sustain extremely cold temperatures whilst still retaining their rubberiness/springiness are best used.

Likewise, the components of the lock assembly, including either or both of the main body 4 and the protruding member 5 are preferably chosen to minimise corrosion which could then result in difficulty in the sliding operation of the components. As such, corrosion resistant materials, to minimise pitting type corrosion are preferably used.

It will be appreciated that by inserting a first end 14 of the body 4 into the cavity, an operator may preferably, by hand, push the body 8 into position against the bias of the biasing means 6 such that the protruding member is forced backwardly into the body 4 whilst the body 4 is being inserted into position. Then, once the protruding member 5 passes the aperture formed in the wear tooth 2, the protruding member then, under the force of the biasing means 6, be biased outwards to engage under the aperture to thereby secure the first member to the second member.

It will therefore be understood by persons skilled in the art that the tooth is thereby securely fastened to the nose of the excavator, ready for use.

That is, the shoulder about the retaining aperture of the wear tooth 2 then impedes the body 4 from being removed from the aligned cavity/aperture.

Therefore, to secure the wear tooth to the nose of the excavator, the following steps are performed. Firstly, the wear tooth is positioned about the nose of the excavator to substantially align a retaining aperture of the tooth with a retaining cavity of the nose. Secondly, the lock assembly 1 is inserted via the aperture into the cavity. This may be preferably done by hand, that is, without the need for any tools, etc. With the locking mechanism having a protruding member biased to protrude from the body, the base portion of the body and the protruding member together abut the retaining cavity to thereby captively retain the lock assembly therein and thereby secure the wear tooth to the nose of the excavator.

In order to release the wear tooth from the nose of the excavator, the following steps may be performed. Firstly the key 9 may be inserted into a keyhole 13 of the lock assembly 4. The key may then be turned like a corkscrew, to operate the operating mechanism to thereby effect withdrawal of the protruding member 5 into the body 4 against the bias of the biasing means 6. The key may then be moved, by hand, in an arcuate manner such as shown by arrow 14 to thereby rotate the lock assembly 4 out from the retaining cavity and the retaining aperture.

Once the lock assembly is removed, the wear tooth may then be removed from the nose of the excavator.

It will therefore be appreciated by persons skilled in the art that the present invention provides a unique lock assembly which is quick and easy to use and which requires no specialised tooling other than the key 9 for removal of the lock assembly. That is, no tooling is required for insertion of the lock assembly to thereby secure the tooth to the nose of the excavator and, only the key 9 is required to remove the locking assembly to thereby effect removal of the wear tooth from the nose of the excavator. The key therefore forms the dual functions of being an "unlocking" and a "removal" tool.

Figure 6:
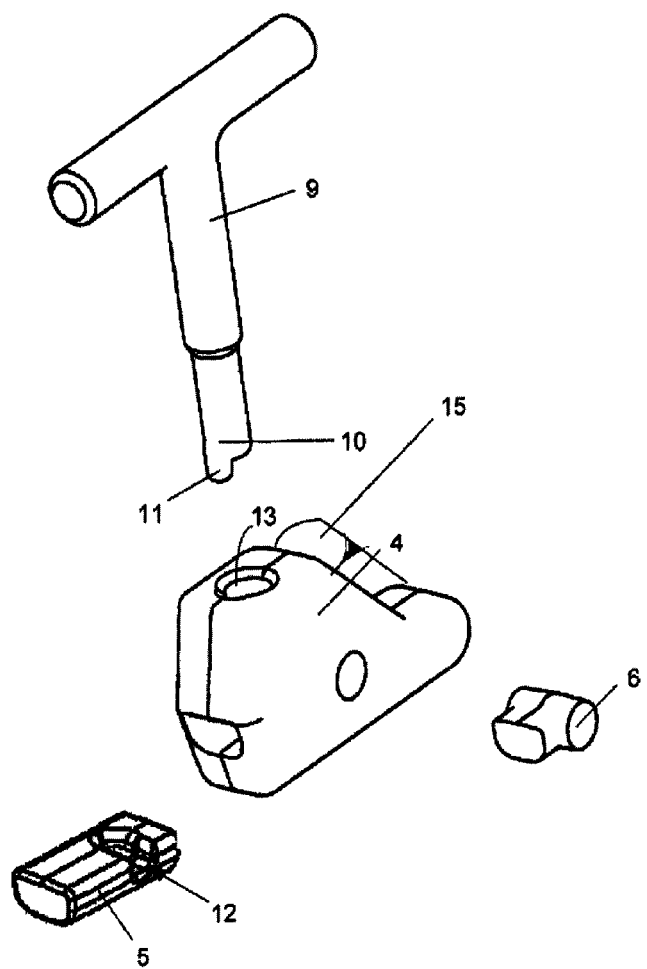
FIG. 6 illustrates an exploded view of another embodiment of the device of the present invention.

FIG. 6 shows another alternative embodiment of the lock assembly of the present invention, wherein the body 4 includes a portion 15 on the rear face thereof, which may be formed of vulcanised rubber or like material. This acts to prevent the ingress of dirt and other foreign matter into the "slot" which may otherwise impede the arcuate movement of the body when being removed from the slot (retaining aperture/cavity).

The lock assembly itself may be provided with a plug or other covering over the keyhole 13 to avoid the ingress of dirt and other material into the lock assembly. This covering may however be relatively easily perforated by the key 9, when removal of the locking device body is required. This would ensure that no dirt etc falls into the keyhole whilst the excavator is in use. The key therefore also has the function of removing the "dirt plug", when being inserted into the "keyhole".

Figure 7:
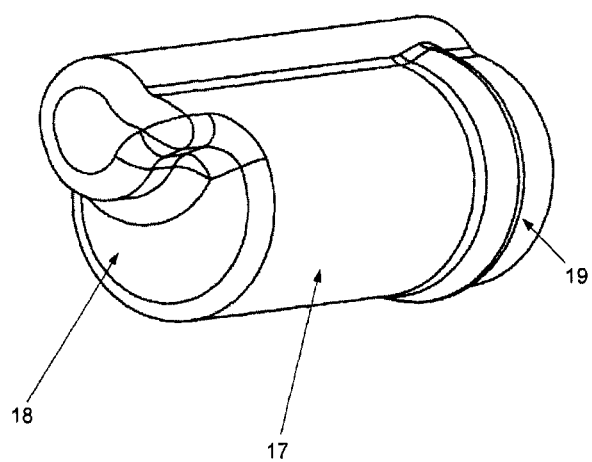
FIG. 7 illustrates a dirt plug, which be inserted into the lock assembly of the present invention; and, FIG. 8 illustrates the lock assembly of the present invention, with the dirt plug of FIG. 7 inserted therein.

FIG. 7 shows a typical "dirt plug" which may be removably inserted with the "keyhole", to prevent the ingress of dirt.

Figure 8:
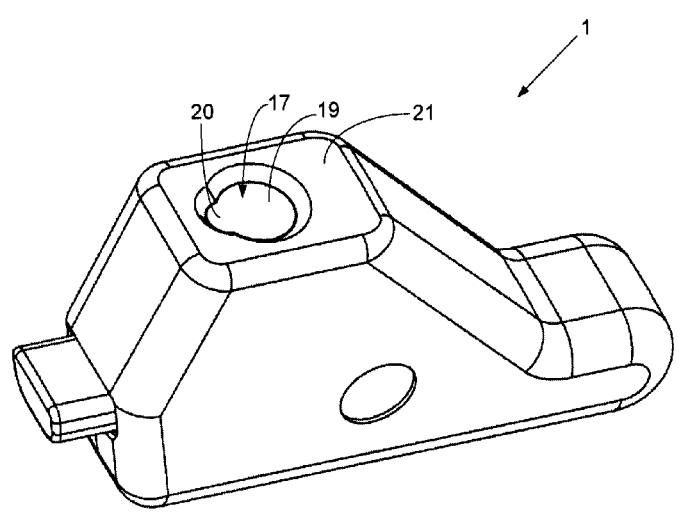

FIG. 8 shows the lock assembly with the "dirt plug" inserted therein. A first end 18 is adapted to fit into the slot 12 of the protruding member 5, and, the second end 19 is adapted to seat substantially in line with or slightly behind the upper surface 21 of the lock assembly. The second end 19 of the dirt plug is preferably provided with an orifice 20 which is adapted to receive a tool to remove the dirt plug to be inserted, so as to remove the dirt plug from the lock assembly, when required.

It will be appreciated by persons skilled in the art that numerous variations and modifications will become apparent. All such variations and modifications should be considered to fall within the spirit and scope of the invention as broadly hereinbefore described.

The claims defining the present invention are as follows:

1. A lock assembly adapted to releasably secure a first member to a second member, said lock assembly including:
    a body, including a base portion and a retaining portion, wherein the base portion is adapted to be inserted within a retaining cavity of said second member, and, said retaining portion is adapted to at least partially extend into a retaining aperture of said first member, said body including a keyhole extending substantially through said retaining portion of said body;
    a protruding member, adapted to selectively protrude linearly outwardly from within said base portion of said body between a protruded or locked position, wherein said base portion of said body and said protruding member together abut said retaining cavity to be thereby captively retained therein, and, a withdrawn or unlocked position;
    a biasing element, adapted to normally bias said protruding member towards said locked position wherein said protruding member extends outwards of said body; and,
    an operating mechanism, to unlock said lock assembly, including an arcuate slot formed in said protruding member which is adapted to be operated by a key being removably inserted into said keyhole to effect engagement of a finger of said key into said slot in said protruding member, such that when said key is rotated about its longitudinal shaft, said protruding member moves in a lineal manner in a direction substantially orthogonal to said longitudinal shaft against the bias of said biasing element between said protruded or locked position and said withdrawn or unlocked position.

2. A lock assembly as claimed in claim 1, wherein said first member is an excavator wear tooth and said second member is a nose of an excavator.

3. A lock assembly as claimed in claim 1, wherein to install said lock assembly in said retaining cavity/aperture, the body is pushed, by hand or otherwise.

4. A lock assembly as claimed in claim 3, wherein, at least part of said retaining portion of said body is adapted to bear against at least part of said retaining aperture, to thereby secure said first member to said second member.

5. A lock assembly as claimed in claim 1, wherein said key is used to move said body in an arcuate manner, to rotate and pull, or otherwise apply a force to rotate or move said lock assembly out from said retaining cavity and said retaining aperture.

6. A lock assembly as claimed in claim 1, wherein said retaining aperture is shaped so as to permit said resiliently biased protruding member to be guided into position as it is being inserted via said retaining aperture into said retaining cavity.

7. A lock assembly as claimed in claim 6, wherein said retaining aperture is larger in dimension than said retaining cavity, such that, when in the protruded or locked position, a shoulder about said retaining aperture impedes said body from being removed.

8. A lock assembly as claimed in claim 1, wherein said biasing means is formed of rubber material.

9. A lock assembly as claimed in claim 8, wherein said rubber material is adapted to operate at a wide temperature range, such as, but not limited to −45° C. to +150° C.

10. A lock assembly as claimed in claim 1, wherein at least one of said body and said protruding member is formed of substantially corrosion resistant material.

11. A lock assembly as claimed in claim 1, wherein, said keyhole is adapted to receive a dirt plug therein, during use of said lock assembly.

12. A method of securing a wear tooth to a nose of an excavator, the method including the steps of:
    positioning said wear tooth about the nose of the excavator, so as to substantially align a retaining aperture of said tooth with a retaining cavity of said nose;
    inserting a lock assembly via said aperture into said cavity, the lock assembly being substantially as claimed in claim 1;
    whereby, said lock assembly is inserted into said cavity by a user pressing said body into said aperture/cavity by hand, that is, without the need for a key or other tool.

13. A method of releasing a wear tooth from the nose of an excavator, the method including the steps of:
    inserting a key into a key hole of a lock assembly, the lock assembly being substantially as claimed in claim 1;
    rotating said key to linearly move said operating mechanism and thereby effect withdrawal of said protruding member into said body against the bias of said biasing means;
    moving said key in an arcuate manner to thereby rotate and remove said lock assembly out from the retaining cavity and the retaining aperture.

14. A method of releasing a wear tooth from the nose of an excavator as claimed in claim 13, wherein, in said moving step, said key is moved by hand in said arcuate manner to thereby remove said body from said retaining cavity/aperture.

* * * * *